United States Patent [19]

Cater

[11] Patent Number: 5,163,588
[45] Date of Patent: Nov. 17, 1992

[54] ATOMIZING PUMP DISPENSER FOR WATER BASED FORMULATIONS

[75] Inventor: Miro S. Cater, Newtown, Conn.

[73] Assignee: Bespak Plc, Norfolk, United Kingdom

[21] Appl. No.: 682,936

[22] Filed: Apr. 10, 1991

[51] Int. Cl.$^5$ ............................................. G01F 11/36
[52] U.S. Cl. .................................. 222/321; 222/341; 222/385
[58] Field of Search ............... 222/321, 340, 341, 383, 222/385; 239/333

[56] References Cited

U.S. PATENT DOCUMENTS

| | | | |
|---|---|---|---|
| 4,089,442 | 5/1978 | Hafele et al. | 222/385 X |
| 4,122,982 | 10/1978 | Giuffredi | 222/321 |
| 4,230,242 | 10/1980 | Meshberg | 222/321 |
| 4,274,560 | 6/1981 | Cater | 222/383 X |
| 4,735,347 | 4/1988 | Shultz et al. | 222/385 X |

FOREIGN PATENT DOCUMENTS 8702225  4/1989  Netherlands ........................ 222/321

*Primary Examiner*—Andres Kashnikow
*Assistant Examiner*—Joseph A. Kaufman
*Attorney, Agent, or Firm*—Beveridge, DeGrandi & Weilacher

[57] ABSTRACT

The lower end of a first hollow vertical cylinder curves inwardly to merge with the upper end of a lower second cylinder. A hollow vertical piston extends through a top opening of the first cylinder into the first cylinder and is vertically movable therein with a lower end of the piston slidably engaging the inner surface of the first cylinder. A vertical member has upper and lower integral sections, the lower section being enlarged with respect to the upper portion, the upper section being engagable or disengagable with the upper end of the piston to define a first closed or open port therewith. A third vertical hollow cylinder has a lower end in continuous fluid sealing engagement with the inner surface of the second cylinder. An upper end of the third cylinder is engagable or disengagable with the lower section to define a second closed or open port therewith. The first port is open when the second port is closed and vice versa. A spring bears against a lower end of the second cylinder and extends upwardly within the third cylinder to engage the lower section and also to engage the upper end of the third cylinder when the lower section is separated from the third cylinder. The spring has fully extended and fully compressed positions.

12 Claims, 2 Drawing Sheets

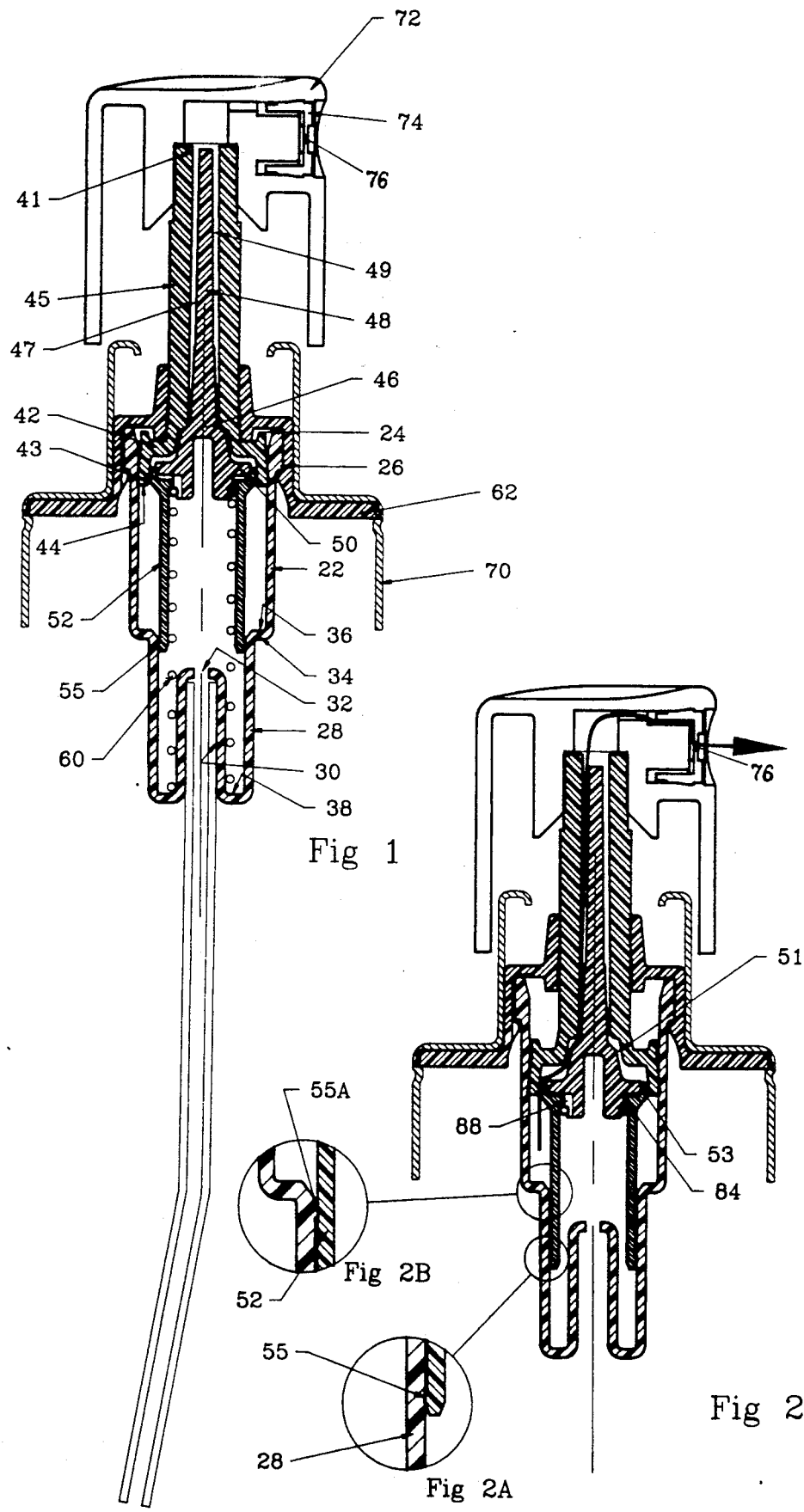

ATOMIZING PUMP DISPENSER FOR WATER BASED FORMULATIONS

BACKGROUND OF THE INVENTION

The present invention relates to atomizing pump dispensers which are adapted to be secured to containers filled with fluids and which are manually operated to dispense such fluids. Such dispensers have actuators which are normally in raised position and which are manually depressed in order to initiate the discharge of a quantity of fluid from a container. When the manual pressure is removed, the actuators are automatically returned to the normal raised position. Aerosol packages deliver optimum performance for hair sprays and other personal care formulations because of their ability to deliver a fine particle size spray without causing clogging of the dispenser when such formulations contain relatively high concentrations of solids.

However, because of environmental considerations, use of such packages will be minimized in the near future. Pump dispensers are acceptable alternatives to areosols, providing that alcohol is used as a solvent of these formulations to minimize the tendency to clog. Nevertheless, alcohol is a volatile organic compound (VOC) and such compounds also create environmental damage. Future VOC standards will limit the use of VOCs.

The obvious substitute for VOCs is water, since water does not create environmental damage. Water based formulations cause known types of pump dispensers to clog, particularly when the formulations contain high percentages of solids or have relatively low viscosity.

The present invention is directed toward a new and improved type of atomizing pump dispenser which is capable of properly delivering water based formulations without clogging even when such formulations contain high percentages of solids and/or have low viscosity.

SUMMARY OF THE INVENTION

Accordingly, it is an object of the present invention to provide a new and improved atomizing pump dispenser which will properly deliver water based formulations as sprays without clogging even when such formulations contain high percentages of solids and/or are highly viscous.

Another object is to provide a new and improved atomizing pump dispenser of the character indicated wherein the discharge spray is produced during the entire period of the dispenser downstroke and wherein the dispenser continues to be charged with fluid during the entire period of the dispenser upstroke.

Yet another object is to provide a new and improved atomizing pump dispenser of the character indicated wherein the component parts of the dispenser which are moved together or apart or which are in continuous sliding contact during operation are subjected to a self cleaning wiping action which prevents clogging.

These and other objects and advantages of the invention will either be explained or will become apparent hereinafter.

An atomizing pump dispenser, in accordance with the principles of this invention employs a vertical hollow body having a first hollow vertical upper cylinder having a top opening and a second hollow vertical lower cylinder with a diameter smaller than that of the first cylinder. The lower end of the second cylinder has a central opening spaced from the inner wall by a circular groove. The lower end of the first cylinder curves inwardly to merge with the upper end of the second cylinder.

A hollow piston having upper and lower open ends is vertically movable within the body between fully raised and fully lowered positions with the lower end of the piston slidably engaging the inner surface of the first cylinder while always remaining in fluid sealing engagement therewith.

A vertical member which is vertically movable within the body between fully raised and fully lowered positions, has upper and lower integral sections. The lower section is enlarged with respect to the upper section. The upper section is engagable with and separable from the upper end of the piston. The upper section and the piston define a first port which is open when the upper section is separated from the upper end of the first piston and which is closed when the upper section engages the upper end of the first piston A third vertical hollow cylinder has open lower and upper ends, and has a diameter which is slightly less than that of the second cylinder. The lower end of the third cylinder is in continuous fluid sealing engagement with at least a portion of the inner surface of the second cylinder. The upper end of the third cylinder is engagable with and disengagable from the lower section. The third cylinder and the lower section define a second port which is open when the lower section is disengaged from the upper end of the third cylinder and is closed when the lower section engages the upper end of the third cylinder. The first port is open when the second port is closed and is closed when the second port is open.

Spring means is disposed within the body, bearing against the groove in the second cylinder and extending upwardly within the third cylinder to engage the upper end of the third cylinder and also to engage the lower section when the lower section engages the upper end of the third cylinder. The spring means has fully extended and fully compressed positions.

Actuator means provided with a fluid discharge orifice communicating with the first port is disposed above and engaging the piston in a normal fully raised position at which the spring means is in fully extended position. The actuator means, when subjected to downward pressure initiates a downstroke causing the first port to open and the second port to close, thereby producing a spray discharge of fluid through the discharge orifice which continues during the entire peirod of the downstroke. The spring means, when the downward pressure is released, automatically initiates an upstroke causing the second port to open and the first port to close, thereby causing the dispenser to fill with fluid during the entire period of the upstroke while returning the actuator means to its normally raised position.

Since the second port is opened when the first port is closed and is closed when the first port is open, the second port remains open during the entire period in which the member is raised from fully lowered to fully raised position. The dispenser continues to fill with fluid during the entire period of the upstroke. Conversely, the first port remains open during the entire period in which the member is lowered from fully raised to fully lowered position so that the dispenser continues to discharge fluid during the entire period of the downstroke.

The various component parts of this dispenser whether moved together or apart or maintained in continuous sliding contact during operation are subjected to a self cleaning or wiping action which prevents buildup onto these parts of fluids and/or solids in the formulation. Such buildup causes clogging.

High viscous fluids, because of their viscosity, move more slowly than low viscosity in response to pressure changes. In the known dispenser, the duration of the periods in which ports are opened and closed can be too short for proper movement of highly viscous fluids to ensue. The present invention enables the duration of these periods to be lengthened in such manner that proper movement can take place.

BRIEF DESCRIPTION OF THE DRAWINGS

FIG. 1 is a vertical cross sectional view of an atomizing dispenser in accordance with the invention as shown at rest.

FIG. 2 is a view similar to FIG. 1 but showing the dispenser during its downstroke.

FIG. 2A is a detail view of a portion of the structure shown in FIG. 2.

FIG. 2B is a detail view showing a slight modification of the structure shown in FIG. 2.

DETAILED DESCRIPTION OF PREFERRED EMBODIMENT

Figure 3:
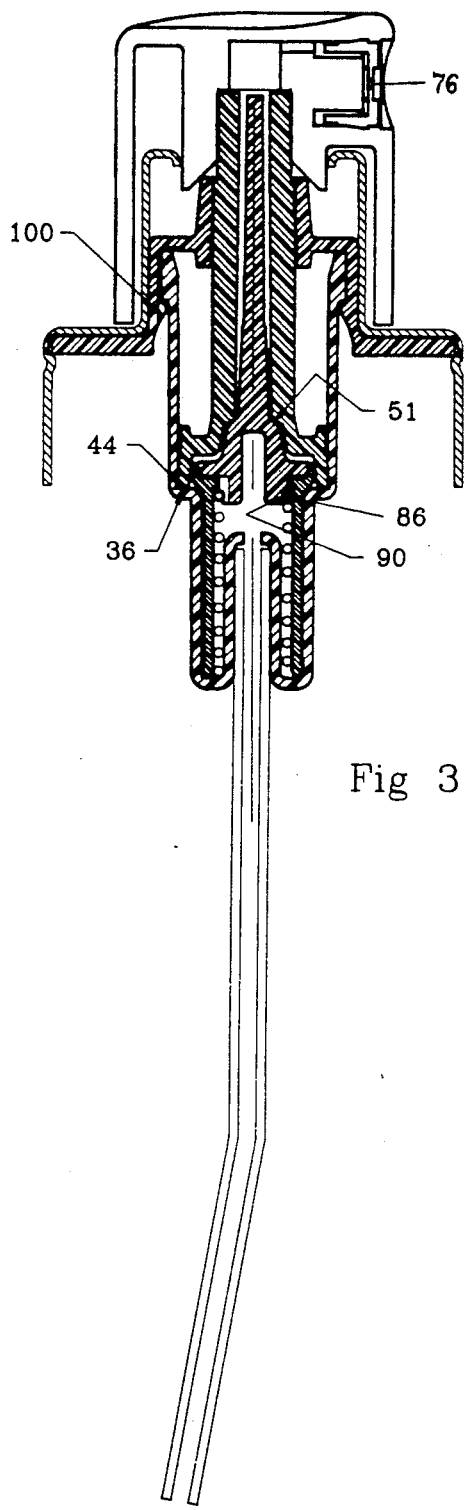
FIG. 3 is a view similar to FIG. 1 but showing the dispenser at the bottom of the downstroke.
Figure 4:
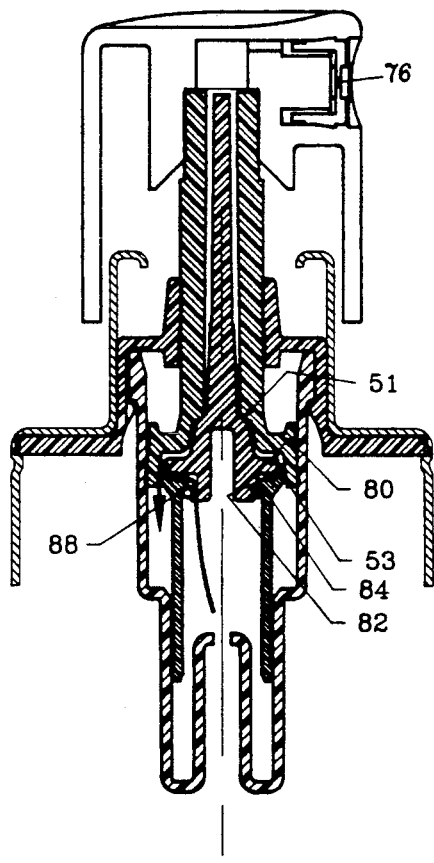
FIG. 4 is a view similar to FIG. 1 but showing the dispenser during its upstroke.
Figure 5:
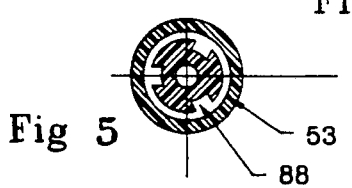
FIG. 5 is a detail cross sectional view of a portion of the structure shown in FIG. 3.

As shown in FIGS. 1-5, an atomizing pump dispenser utilizes a vertical hollow elongated body having an upper vertical hollow first cylinder 22 with a top opening 24 surrounded by an outer horizontal lip 26. The body has a lower vertical hollow second cylinder 28 having a diameter smaller than that of the first cylinder. The lower end of the cylinder 28 has a central aperture 32. Portions of the cylinder 28 adjacent the aperture can be formed into a vertical channel 30 which can extend upward or downward to receive a dip tube 31. The lower end of the first cylinder curves inwardly to merge at 34 with the upper end of the second cylinder, forming therewith an inner circular groove 36. The lower end of the second cylinder 28 has a horizontal circular groove 38 disposed between the inner periphery of cylinder 28 and the outer periphery of channel 30.

A hollow piston 42 has an upper and lower open ends 41 and 43. Piston 42 has an integral elongated upper extension 45 with a vertical bore 47 connected to open upper end 41. The piston is vertically movable between a fully raised position and a fully lowered position. The lower end of the piston is provided with an outer peripheral skirt 44 which slidably engages the inner surface of the cylinder 22. The lowest position of the piston is reached when skirt 44 engages groove 36. The fully raised position is shown in FIG. 1.

A vertical member 46 has an upper section 48 integral with an enlarged lower section 50. The upper section extends into the upper end of the piston and into the bore 47, thus forming a vertical channel 49 between the section 48 and extension 45. The upper section and the piston define a first port 51 which is open when the upper section is separated from the upper end of the piston and which is closed when the upper section engages the lower end 43 of the piston.

A third vertical hollow cylinder 52 has open lower and upper ends, and has a diameter which is slightly less than that of the second cylinder. The lower end of the third cylinder, as shown in FIG. 2A, has a small outwardly extending circular projection 55 which is in continuous fluid sealing engagement with the inner surface of the second cylinder. Alternatively, as shown in FIG. 2b, the inner surface of the second cylinder can have a small outwardly extending circular projection 55A. Thus the lower end of the third cylinder is always in continuous sealing engagement with at least a portion of the inner surface of the second cylinder.

The upper end of the third cylinder is engageable with and separable from the lower section 50. The lower section 50 extends into the upper end of the third cylinder when engaged thereto. The third cylinder and the lower section define a second port 53 which is open when the lower section is spaced from the upper end of the third cylinder and is closed when the lower section engages the upper end of the third cylinder. The first port is open when the second port is closed and is closed when the second port is open.

In the embodiment shown in FIGS. 1-5, the lower section 50 has a horizontally outwardly extending integral ring 80 and the upper end of the third cylinder has an outwardly and upwardly flaring surface 82 which engages ring 80 in sealing engagement when the second port is closed and is spaced below ring 80 when the port is open. Surface 82 has an inwardly extending ring 84. The lower end of section 50 has a recess 90 which receives the upper most turn 86 of spring 60. Turn 86 is disposed below ring 84 and has a larger diameter, so that ring 84 is always in sliding engagement with the vertical outer surface of the lower end of section 50 whether the second port is open or closed. The lower end of section 50 also has spaced vertical conduits 88 disposed inside of turn 86 so that fluid can flow therethrough and out of port 53 when this port is open.

Spring 60 is disposed within the body to bear against the horizontal annular surface 38 and to extend upwardly within the third cylinder to engage lower section 50 and also to engage the upper end of the third cylinder.

The spring has a fully extended position when the dispenser is in rest position and has a fully compressed position when the dispenser is positioned at the bottom of the downstroke. When the dispenser is in rest position, the spring pressure acts to close port 51 and open port 53.

A hollow collar 62 has a larger open lower end and a smaller open upper end, the upper end of the first cylinder 22 extending through the lower end of the collar and abutting the upper end of the collar. The piston extension 45 extends slidably through the upper end of the collar. The collar 62 is fitted within a cup 70. When the dispenser is in rest position, the piston extends upwardly through the collar and cup. When the dispenser is in use, the cup engages the top of the open neck of a vertically disposed container filled with fluid.

An actuator 72 having the general shape of an inverted hollow cup is provided with a side mounted insert 74 having a fluid discharge orifice 76 which communicates via channel 49 with the first port. The actuator is disposed above and engages the piston extension. When the actuator is in rest position, the first port is closed and the second port is open. Both the first and second cylinders are filled with fluid.

When the actuator is subjected to downward pressure, an initial small downward movement of the member toward the third cylinder closes the second port. The fluid is incompressible, and the resultant hydraulic pressure immediately forces the first port open, thereby producing a spray discharge of fluid through the discharge orifice. The downward movement continues until the piston engages groove 36, and the lower end of cylinder 50 engages groove 38. This is the bottom position and the spring is in fully compressed position. The member engages the piston, closing the first port. On the return stroke, the closure of the first port creates a partial vacuum, causing the lower end of the member to pull upwardly away from the upper end of the third cylinder, opening the second port and drawing fluid out of the container through the dip tube and opening 32 into the second and then the first cylinder. The spring, when the downward pressure is released, automatically returns to its fully extended position and returns the actuator means to its normally raised position, at which point the first port is closed and the second port is opened. Consequently, the second port remains open during the entire period in which the member is raised from fully lowereed to fully raised position and remains closed while the member is being lowered from fully raised to fully lowered position.

Thus, the lower end of the third cylinder is always in sliding engagement with the inner surface of the second cylinder; the lower end of the piston is always in sliding engagement with the inner surface of the second cylinder; and the upper end of the third cylinder is always in sliding engagement with the lower section of the member. As shown in FIGS. 1–5, the adjacent surfaces of the parts defining the first port are curved so that these surfaces slide toward and away from each other as the first port is opened and closed. Similarly, the adjacent surfaces of the parts defining the second port are curved so that these surfaces slide toward and away from each other as the second port is opened and closed. These relationships cause the component parts to be subjected to a self cleaning and wiping action, thus preventing clogging.

While the invention has been described with particular reference to a preferred embodiment, the protection sought is to be limited only by the terms of the claims which follow.

What is claimed is:

1. An atomizing pump dispenser comprising:
    a vertical hollow elongated body having a first hollow vertical upper cylinder having a top opening and a second hollow vertical lower cylinder with a diameter smaller than that of the first cylinder, a lower end of the second cylinder having a central opening which is spaced from an inner wall of the second cylinder by a horizontal circular groove, the lower end of the first cylinder curving inwardly to merge with the upper end of the second cylinder;
    a hollow piston having upper and lower open ends and being vertically movable within the body between fully raised and fully lowered positionswith the lower end of the piston slidably engaging the inner surface of the first cylinder while always remaining in fluid sealing engagement therewith;
    a vertical member being vertically movable between fully raised and fully lowered positions, the member having upper and lower integral sections, the lower section being enlarged with respect to the upper portion, the upper section being engagable with the upper end of the piston to define a first closed port therebetween and being disengagable from the upper end of the piston to define a first open port therebetween;
    a third vertical hollow cylinder having open lower and upper ends, and having a diameter which is slightly less than that of the second cylinder, the lower end of the third cylinder being in continuous fluid sealing engagement with at least a peripheral portion of the inner surface of the second cylinder, the upper end of the third cylinder being engagable with the lower section to define a closed second port therebetween and disengagable from the lower section to define an open second port therebetween, the first port being open when the second port is closed and vice versa; and
    spring means disposed within the body, bearing against the horizontal groove and extending upwardly within the third cylinder to engage lower section and also to engage the upper end of the third cylinder when the lower section is separated from the third cylinder, the spring means having fully extended and fully compressed positions.

2. The dispenser of claim 1 further including a container of fluid communicating with the opening in the lower end of the second cylinder.

3. The dispenser of claim 2 further including actuator means provided with a fluid discharge orifice communicating with the first port, the actuator means being disposed above and engaging the piston, the actuator means, when subjected to downward pressure initiating a downstroke causing the first port to open and the second port to close, thereby producing a spray discharge of fluid through the discharge orifice which continues during the entire period of the downstroke, the spring means, when the downward pressure is released, automatically initiating an upstroke causing the second port to open and the first port to close, thereby causing the dispenser to fill with fluid during the entire period of the upstroke while returning the actuator means to its normally raised position.

4. The dispenser of claim 1 wherein the piston has a vertical bore having an inner surface and extending between its ends, the upper section of the member being disposed in said bore and spaced from the inner surface, the separation of the upper section and the inner surface of the bore defining a fluid discharge channel connecting the first port to the actuator means.

5. The dispenser of claim 4 wherein the upper section of the member extends into the upper end of the piston.

6. The dispenser of claim 5 wherein the lower section of the member has an outwardly extending ring and the upper end of the third cylinder has a surface which engages said ring when the second port is closed and is spaced from the ring when the second port is opened.

7. The dispenser of claim 6 wherein the lower section of the member has spaced vertical conduits for fluid.

8. The dispenser of claim 1 wherein all component parts which are moved together or apart or which are in continuous sliding contact during operation are subjected to a self cleaning wiping action which prevents clogging.

9. The dispenser of claim 7 wherein the upper end of the spring means engages the lower section of the member and the upper end of the third cylinder.

10. The dispenser of claim 9 wherein the adjacent surfaces of the upper section and the piston defining the first port curve away from each other.

11. The dispenser of claim 10 wherein the adjacent surfaces of the lower section of the member and the upper end of the third cylinder defining the second port curve away from each other.

12. The dispenser of claim 1 wherein the lower end of the third cylinder is in continuous fluid sealing engagement with the inner surface of the second cylinder.

* * * * *